(12) United States Patent  
Sheng et al.

(10) Patent No.: US 9,307,145 B2  
(45) Date of Patent: Apr. 5, 2016

(54) VIDEO CAMERA WITH TEMPERATURE SENSOR

(71) Applicant: Zhejiang Uniview Technologies Co., Ltd, HangZhou (CN)

(72) Inventors: Hua Sheng, Hangzhou (CN); YiFei Sun, Hangzhou (CN)

(73) Assignee: Zhejiang Uniview Technologies Co., Ltd, HangZhou (CN)

( * ) Notice: Subject to any disclaimer, the term of this patent is extended or adjusted under 35 U.S.C. 154(b) by 0 days.

(21) Appl. No.: 14/390,014

(22) PCT Filed: Jun. 26, 2013

(86) PCT No.: PCT/CN2013/078039  
§ 371 (c)(1),  
(2) Date: Oct. 1, 2014

(87) PCT Pub. No.: WO2014/026508  
PCT Pub. Date: Feb. 20, 2014

(65) Prior Publication Data  
US 2015/0062417 A1    Mar. 5, 2015

(30) Foreign Application Priority Data  
Aug. 16, 2012   (CN) .......................... 2012 1 0292872

(51) Int. Cl.  
*H04N 5/232*    (2006.01)  
*H04N 5/225*    (2006.01)  
(Continued)

(52) U.S. Cl.  
CPC .............. *H04N 5/23241* (2013.01); *G01K 7/16* (2013.01); *G03B 17/55* (2013.01); *H04N 5/225* (2013.01)

(58) Field of Classification Search  
CPC ......... G01K 7/16; G03B 17/55; H04N 5/225; H04N 5/23241  
See application file for complete search history.

(56) References Cited

U.S. PATENT DOCUMENTS 6,504,155 B1 * 1/2003 Ookawa ................... H04N 5/33  
250/352  
7,762,731 B2 * 7/2010 Arbuckle ............... G03B 17/08  
277/628

(Continued)

FOREIGN PATENT DOCUMENTS

CN            101009816 A      8/2007  
CN            200976110 Y      11/2007

(Continued)

OTHER PUBLICATIONS

State Intellectual Property Office of the P.R. of China, International Search Report of PCT/CN2013/078039, Sep. 13, 2013, SIPO, 4 Pages.

*Primary Examiner* — Amy Hsu  
(74) *Attorney, Agent, or Firm* — Alleman Hall McCoy Russell & Tuttle LLP

(57) ABSTRACT

A video camera includes a first temperature sensor, a control logic circuit, a main system, a heating module, a fan and a power supply. After the power supply supplies power to the video camera, the first temperature sensor comes to be active, when the temperature sensed by the first temperature sensor is less than T1, the first temperature sensor outputs a control signal to the control logic circuit, which activates the heating module and the fan and prevents the power supply from supplying to the main system; and when the temperature sensed by the first temperature sensor is greater than T1, the first temperature sensor outputs a control signal to the control logic circuit which enables the power supply to supply to the main system and inactivates the heating module and the fan, and therefore, a normal activation and stable operation of the video camera at low temperatures are ensured.

9 Claims, 1 Drawing Sheet

(51) Int. Cl.
  *G03B 17/55*      (2006.01)
  *G01K 7/16*       (2006.01)

(56) References Cited

U.S. PATENT DOCUMENTS

| | | | | |
|---|---|---|---|---|
| 8,243,968 B2* | 8/2012 | Suzuki | ............... | H03F 1/52 348/794 |
| 2002/0135474 A1* | 9/2002 | Sylliassen | ............. | G06F 1/3203 340/540 |
| 2003/0025854 A1* | 2/2003 | Hosoda | ............. | H05K 7/20209 349/72 |
| 2003/0071913 A1* | 4/2003 | Yoshida | ................ | H05N 5/232 348/372 |
| 2003/0081934 A1* | 5/2003 | Kirmuss | ................ | B60R 11/02 386/224 |
| 2003/0095688 A1* | 5/2003 | Kirmuss | ................ | B60R 11/02 382/105 |
| 2005/0219430 A1* | 10/2005 | Nagano | ................ | G03B 21/16 349/9 |
| 2007/0273794 A1* | 11/2007 | Sprague | ............... | G02B 27/104 348/744 |
| 2009/0027570 A1* | 1/2009 | Fujinawa | ............... | G03B 21/16 348/744 |
| 2009/0135253 A1* | 5/2009 | Augst | ....................... | B60R 1/00 348/148 |
| 2009/0135258 A1* | 5/2009 | Nozaki | .................. | G03B 17/48 348/207.99 |
| 2009/0244363 A1* | 10/2009 | Sugimura | ........... | H04N 5/2251 348/374 |
| 2012/0307092 A1* | 12/2012 | Kotani | ................. | H04N 5/2226 348/218.1 |
| 2013/0070080 A1* | 3/2013 | Saucier | ................. | H04N 7/183 348/88 |

FOREIGN PATENT DOCUMENTS

| | | |
|---|---|---|
| CN | 101154179 A | 4/2008 |
| CN | 201060401 Y | 5/2008 |
| CN | 201315029 Y | 9/2009 |
| CN | 201491121 U | 5/2010 |
| CN | 101726967 A | 6/2010 |
| EP | 0436797 A2 | 7/1991 |
| JP | S598479 A | 1/1984 |
| JP | H11338025 A | 12/1999 |
| KR | 20010081902 A | 8/2001 |
| WO | 0004720 A1 | 1/2000 |

* cited by examiner

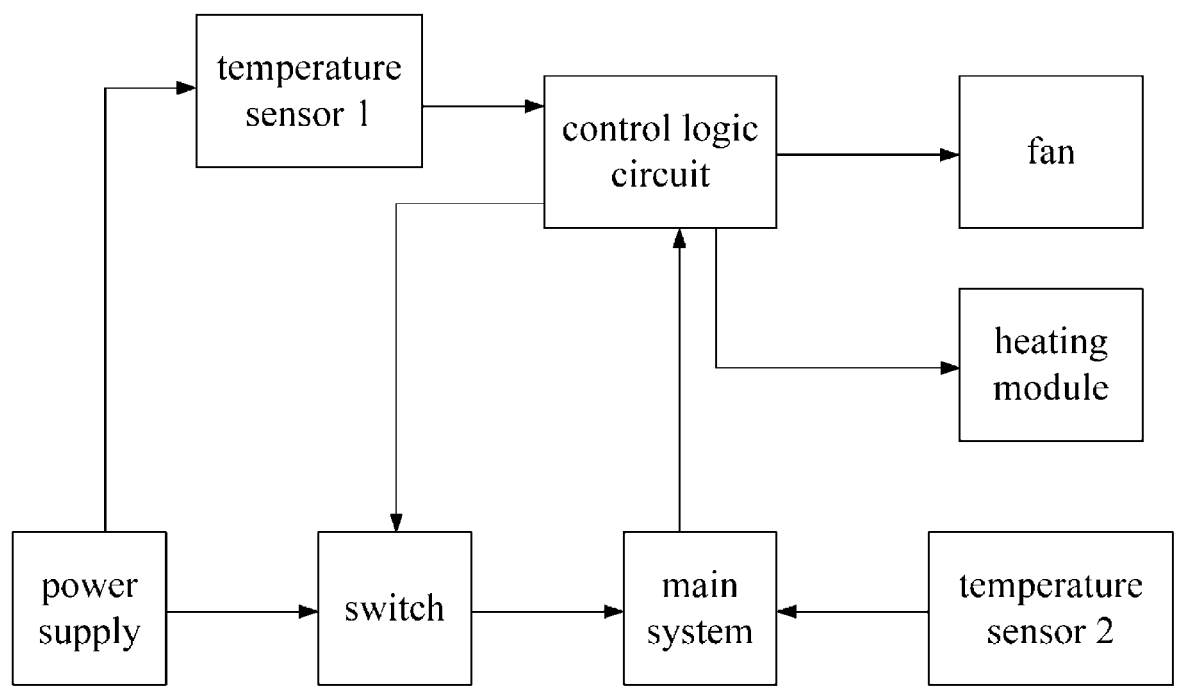

VIDEO CAMERA WITH TEMPERATURE SENSOR

CROSS REFERENCE TO RELATED APPLICATIONS

The present application is a U.S. National Phase of International Patent Application Serial No. PCT/CN2013/078039, entitled "VIDEO CAMERA," filed on Jun. 26, 2013, which claims priority to Chinese Patent Application No. 2012102928720, filed on Aug. 16, 2012, the entire contents of each of which are hereby incorporated by reference for all purposes.

FIELD OF THE INVENTION

The invention relates to video cameras, and more particularly to a video camera including a heating controller system.

BACKGROUND

Some elements assembled in surveillance video cameras are unable to operate reliably when the video cameras are exposed to low environmental temperatures, for example, integration chips are the kinds of elements. In general, heating devices are set in the video cameras. There are two conventional methods of controlling heating widely used in this field, one is by using a thermostat, and the other is by using system software. The principle of controlling heating by using a thermostat is described as follow. An automatic-resetting thermostat incorporates a disc shaped element made by a bimetallic strip. The bimetallic strip is deformed when being heated and causes a reverse jump to push a lever, which sharply breaks contacts, thus a circuit is cut off and a heater is turned off. The bimetallic strip restores deformation when the ambient temperature drops down, then the contacts are closed automatically, thus the circuit is cut on and the heater is turned on. This method can be easily achieved, but its temperature threshold is determined by the thermostat, which is not configurable. Moreover, the thermostat is poor in consistency and reliability. On the other side, a fan coupled with the heater is not controllable, staying in a normally open state. The method of using system software to control heating means getting temperature values of internal temperature sensors by the system software, and controlling opening or closing of the heating system according a certain strategy. This method can achieve the software configuration in the trigger temperature of heating. But once there are some errors occurred in the system software, the whole heating system will fall into confusion. In addition, an extremely low temperature will induce the system to start unsuccessfully or restart continually in the above two methods.

SUMMARY

The present invention provides a video camera including a first temperature sensor, a control logic circuit, a main system, a heating module, a fan and a power supply. After the power supply supplies power to the video camera, the first temperature sensor comes to be active, when the temperature sensed by the first temperature sensor is less than T1, the first temperature sensor outputs a control signal to the control logic circuit, which activates the heating module and the fan and prevents the power supply from supplying to the main system; and when the temperature sensed by the first temperature sensor is greater than T1, the first temperature sensor outputs a control signal to the control logic circuit, which enables the power supply to supply to the main system.

Preferably, the video camera further includes a second temperature sensor, wherein the main system receives a temperature sensed by the second temperature sensor after being supplied by the power supply, when the temperature is greater than T1 and less than T2, the main system outputs a control signal to the control logic circuit, which activates the heating module and the fan.

Preferably, the heating module further includes a first heating element and a second heating element, wherein when the received temperature sensed by the second temperature sensor is less than T2 and greater than T3, the main system outputs a control signal to the control logic circuit, which activates the first heating element and the fan, when the received temperature sensed by the second temperature sensor is less than T3 and greater than T1, the main system outputs a control signal to the control logic circuit, which activates the first heating element, the second heating element and the fan.

Preferably, when the heating module is out of control by the main system because of a software error and the temperature sensed by the first temperature sensor is less than T1, the first temperature sensor outputs the control signal to the control logic circuit, which activates the heating module and the fan and prevents the power supply from supplying to the main system.

Preferably, a temperature regulating resistance is connected with the first temperature sensor, wherein the value of T1 is determined by the resistance value of the temperature regulating resistance.

Preferably, the video camera further includes a second temperature sensor, wherein the main system receives a temperature sensed by the second temperature sensor after being supplied by the power supply, when the temperature is greater than T1 and less than or equal to T2, the main system outputs a control signal to the control logic circuit, which activates the heating module and the fan.

Preferably, the heating module further comprising a first heating element and a second heating element, wherein when the received temperature sensed by the second temperature sensor is less than or equal to T2 and greater than T3, the main system outputs a control signal to the control logic circuit, which activates the first heating element and the fan and inactivates the second heating element; when the received temperature sensed by the second temperature sensor is less than or equal to T3 and greater than T1, the main system outputs a control signal to the control logic circuit, which activates the first heating element, the second heating element and the fan.

Preferably, the main system outputs a control signal to the control logic circuit, which activates the fan for dissipating heat when the temperature in the video camera gets too high.

Preferably, when the temperature sensed by the first temperature sensor is greater than T1, the first temperature sensor outputs the control signal to the control logic circuit, which inactivates the heating module and the fan.

With respect to prior art, the present invention can solve the problem that the video camera starts unsuccessfully or unreliably at low temperatures.

BRIEF DESCRIPTION OF THE DRAWINGS

FIG. 1 is a block diagram of the architecture of a video camera in accordance with an embodiment of the present invention.

DETAILED DESCRIPTION

The present invention controls a heating module of a video camera by adopting the combination of hardware and software. In extremely low-temperature environments, it is the hardware at first that controls the heating module to heat. After the temperature in the video camera rises to a certain temperature, the hardware can control powering to a main system. After the main system works supplied by the power supply, it is the software in the main system instead of the hardware that controls the heating module to heat. The present invention is further described as follows in detail with reference to the specific embodiments and the drawings.

Referring to FIG. 1, it is a block diagram of the video camera for the present invention. The video camera includes a control logic circuit, a temperature sensor 1, a power supply, a fan, a heating module, a switch, a temperature sensor 2 and a main system which is a computing system generally including a CPU, a memory and a flash memory, etc. A hardware part of controlling heating mainly includes the temperature sensor 1 and the control logic circuit. A software part of controlling heating mainly includes the temperature sensor 2, the main system and the control logic circuit. At an extremely low temperature, only the hardware part of controlling heating works: after the power supply supplies power to the video camera, the temperature sensor 1 comes to be active, when the temperature sensed by the temperature sensor 1 is less than T1, for example −20 degrees, the temperature sensor 1 outputs a control signal, for example "Logic 1" to the control logic circuit. The control signal makes the control logic circuit to activate the heating module and the fan and to prevent the power supply from supplying to the main system. Because at the extremely low temperature, it is difficult to ensure that the main system can start normally and work properly in consideration that chips of the main system or even a camera module is sensitive to an operating temperature. The temperature in the video camera gradually increases when the heating module and the fan are activated. After the temperature rises above T1, when the temperature sensed by the temperature sensor 1 is greater than T1, the temperature sensor 1 outputs a control signal, for example "Logic 0", to the control logic circuit. The control signal makes the control logic circuit to enable the power supply to supply to the main system. For example, a switch can be assembled between the power supply and the main system, a control signal output by the control logic circuit controls opening or closing of the switch, which determines whether the power supply supplies to the main system. Thus it ensures that the main system can start normally at a proper temperature when the video camera is in extremely low-temperature environments, and avoids restarting unsuccessfully or continually after the main system fails to start which can seriously influence the main system's life.

After the main system starts to work, a further controlling of heating the video camera is implemented by the software part. When the temperature rises to T1, the control signal output by the temperature sensor 1 makes the control logic circuit to inactivate the heating module and the fan. The temperature sensor 1, also called as a thermostat, can output a control signal at a certain temperature. A temperature regulating resistance is connected with the temperature sensor 1. Different resistance values make the difference in the temperature threshold of the control signal output by the temperature sensor 1. For example, the temperature T1 is corresponding to the resistance value R1 of the resistance, if the temperature is asked for rising, the corresponding resistance value needs to be regulated accordingly.

After controlling of heating the video camera is implemented by the main system, the main system will receive a temperature sensed by the temperature sensor 2. For example, the main system regularly reads the temperature sensed by the temperature sensor 2. When the received temperature is greater than T1 and less than or equal to T2, for example, T1 is −20 degrees and T2 is zero degrees, the main system outputs a control signal, for example "Logic 1", to the control logic circuit. The control logic circuit activates the heating module and the fan once again. In a preferred embodiment, the heating module includes two independent heating elements, which can further implement hierarchically controlling for energy saving. When the received temperature sensed by the temperature sensor 2 is less than or equal to T2 and greater than T3, for example, T2 is zero degrees and T3 is −10 degrees, the main system outputs a control signal, for example "Logic 11", to the control logic circuit. The control logic circuit activates a first heating element and the fan. When the received temperature sensed by the temperature sensor 2 is less than or equal to T3 and greater than T1, for example, T1 is −20 degrees and T3 is −10 degrees, the main system outputs a control signal, for example "Logic 10", to the control logic circuit. The control logic circuit activates the first heating element, a second heating element and the fan. When the received temperature sensed by the temperature sensor 2 is greater than T2, for example, T2 is zero degrees, the main system outputs a control signal, for example "Logic 00", to the control logic circuit. The control logic circuit inactivates the first heating element, the second heating element. It is more flexible for implementing controlling the heating module to heat by the main system than by the hardware. For example, the values of T2 and T3 can be set easily just by changing the corresponding software codes. The temperature sensor 2 is connected with the CPU in the main system through an I2C (Inter-Integrated Circuit), the CPU reads the temperature sensed by the temperature sensor 2 through the I2C. It is understood that under the control of the software, with an increase of the temperature in the video camera, the strength of heating is decreasing until it disappears. The whole process is energy-saving and ensures a normal operation of the main system.

In the above descriptions, after the main system starts to work, a further controlling of heating the video camera is implemented by the software part. During this process, if any error occurs in the software, heating won't be implemented, the temperature in the video camera will gradually decrease. If the temperature is less than T1, the main system cannot work normally. But when the temperature in the video camera is less than T1, the temperature sensor 1 outputs the control signal to the control logic circuit, which activates the heating module and the fan and prevents the power supply from supplying to the main system. As the temperature in the video camera gradually increases and then rises above T1, the temperature sensor 1 outputs the control signal to the control logic circuit, which enables the power supply to supply to the main system. At the current temperature which is above T1, the heating controlling software reloads and starts to work after the main system is supplied by the power supply, thus heating the video camera is under a normal control.

The control logic circuit can be built from discrete devices, and also can be achieved by single-chip microcomputers or logic chips. The control signals output by the temperature sensor 1 and by the main system to the control logic circuit are designed according to a concrete implementation of the control logic circuit.

In addition, the fan usually stays in an open state while the heating module is operating. On one hand, it ensures that the air in the video camera is heated evenly and prevents local heating too much; on the other hand, it ensures that the heating module dissipates heat evenly, which extends the heating module's working life. When the heating module is not operating, the main system can control the fan according to the temperature sensed by the temperature sensor 2. For example, if the temperature in the video camera gets too high and heat dissipation is needed, the main system outputs a control signal to the control logic circuit, which activates the fan for dissipating heat.

The foregoing descriptions are only examples of the present disclosure and are not for use in limiting the protection scope thereof. Any modification, equivalent replacement and improvement made under the spirit and principle of the present disclosure should be included in the protection scope thereof.

The invention claimed is:

1. A video camera comprising:
a first temperature sensor;
a control logic circuit;
a main system;
a heating module;
a fan; and
a power supply,
wherein after the power supply supplies power to the video camera, the first temperature sensor comes to be active, when a temperature sensed by the first temperature sensor is less than T1, the first temperature sensor outputs a control signal to the control logic circuit, which activates the heating module and the fan and prevents the power supply from supplying to the main system, and when the temperature sensed by the first temperature sensor is greater than T1, the first temperature sensor outputs a control signal to the control logic circuit, which enables the power supply to supply to the main system,
wherein the control signal outputted by the first temperature sensor is a logic signal;
wherein the control logic circuit is built from discrete devices, or is achieved by single-chip microcomputers or logic chips.

2. The video camera of claim 1, further comprising a second temperature sensor, wherein the main system receives a temperature sensed by the second temperature sensor after being supplied by the power supply, when the temperature is greater than T1 and less than T2, the main system outputs a control signal to the control logic circuit, which activates the heating module and the fan.

3. The video camera of claim 2, wherein the heating module further comprises a first heating element and a second heating element, wherein when the received temperature sensed by the second temperature sensor is less than T2 and greater than T3, the main system outputs a control signal to the control logic circuit, which activates the first heating element and the fan, when the received temperature sensed by the second temperature sensor is less than T3 and greater than T1, the main system outputs a control signal to the control logic circuit, which activates the first heating element, the second heating element and the fan.

4. The video camera of claim 2, wherein when the heating module is out of control by the main system because of a software error and the temperature sensed by the first temperature sensor is less than T1, the first temperature sensor outputs the control signal to the control logic circuit, which activates the heating module and the fan and prevents the power supply from supplying to the main system.

5. The video camera of claim 1, wherein a temperature regulating resistance is connected with the first temperature sensor, wherein the value of T1 is determined by a resistance value of the temperature regulating resistance.

6. The video camera of claim 1, further comprising a second temperature sensor, wherein the main system receives a temperature sensed by the second temperature sensor after being supplied by the power supply, when the temperature is greater than T1 and less than or equal to T2, the main system outputs a control signal to the control logic circuit, which activates the heating module and the fan.

7. The video camera of claim 6, wherein the heating module further comprises a first heating element and a second heating element, wherein when the received temperature sensed by the second temperature sensor is less than or equal to T2 and greater than T3, the main system outputs a control signal to the control logic circuit, which activates the first heating element and the fan and inactivates the second heating element when the received temperature sensed by the second temperature sensor is less than or equal to T3 and greater than T1, the main system outputs a control signal to the control logic circuit, which activates the first heating element, the second heating element and the fan.

8. The video camera of claim 1, wherein the main system outputs a control signal to the control logic circuit, which activates the fan for dissipating heat when a temperature in the video camera gets too high.

9. The video camera of claim 1, wherein when the temperature sensed by the first temperature sensor is greater than T1, the first temperature sensor outputs the control signal to the control logic circuit, which inactivates the heating module and the fan.

* * * * *